United States Patent [19]

Bayha

[11] Patent Number: 5,948,877
[45] Date of Patent: Sep. 7, 1999

[54] INTERNAL GEL COAT STYRENE SUPPRESSION LOW PROFILE ADDITIVE FOR UNSATURATED POLYESTER RESIN SYSTEMS

[75] Inventor: Charles E. Bayha, Collierville, Tenn.

[73] Assignee: Zircon Corporation, Collierville, Tenn.

[21] Appl. No.: 09/096,539

[22] Filed: Jun. 12, 1998

Related U.S. Application Data

[60] Provisional application No. 60/049,469, Jun. 12, 1997.

[51] Int. Cl.$^6$ .................................................. C08G 63/00
[52] U.S. Cl. ............................................ 528/271; 528/272
[58] Field of Search ...................................... 528/272, 271

[56] References Cited

U.S. PATENT DOCUMENTS 5,777,065  7/1998  Wah Ho ................................. 528/272

*Primary Examiner*—Terressa Mosley
*Attorney, Agent, or Firm*—Venable; John W. Schneller

[57] ABSTRACT

Additives have been developed that reduce the emission of volatile monomers, e.g. styrene in unsaturated polyester resin system as well as producing a hard, weather resistant gel coat at the surface. Upon reaction, the polymeric additive comes to the surface and reacts with air to form a hard, mar resistance film. The film also has some reactive double bond that will react with the unsaturated polyester portion. The result is a product that has reduced styrene emissions for static or sprayable unsaturated polyester resins, a hard and clean gel coated surface for low pressure architectural sheet application and a class A surface for Sheet Molded and Bulk Molded Parts. These additives exhibit excellent chemical and weathering properties as well as producing a hard mar resistant surface in peroxide or ultra-violet curable polyester systems.

4 Claims, No Drawings

INTERNAL GEL COAT STYRENE SUPPRESSION LOW PROFILE ADDITIVE FOR UNSATURATED POLYESTER RESIN SYSTEMS

CROSS REFERENCE TO RELATED APPLICATION

This application is a continuation of provisional application No. 60/049,469 filed Jun. 12, 1997, the entire disclosure of which is incorporated herein by reference.

FIELD OF THE INVENTION

This invention relates to a polymer polyester that when added to an unsaturated polyester resin will upon resin cure migrate to the surface and form a film by reaction with air. This product is a high molecular polyester polymer containing low levels of fumaric/maleic double bonds and reactive double bonds capable of air promotion similar to alkyd type curing. The film forming properties result in reduced styrene emission, improved cure of the unsaturated polyester, protection from weather degradation and a class A surface for molded part application.

BACKGROUND OF THE INVENTION

Styrene Suppression Application

Many approaches have been proposed for reducing styrene emission when unsaturated polyester resin has been utilized. Replacement of styrene with less volatile monomers is expensive and these monomers usually do not have the diluent characteristics that styrene possesses. Highly filled resin systems could not be used due to unrealistically high viscosities. The most popular method for styrene reduction is to develop low viscosity oligomers that can accommodate lower styrene levels without significant loss of physical properties or application properties. Although this approach does work with certain applications, closed mold and highly filled sprayable systems are difficult or impossible utilizing this approach. A third approach is to initiate a film with ultra-violet light. The film keeps the styrene in and air out. Lower styrene emission and faster resin cure is the result. Again, exposure to ultra-violet radiation of the resin system in cases cannot be accomplished in a practical way.

Gel Coated Application

In low pressure molded fabrication of architectural sheet, the catalyzed resin is placed continuously on a moving roll of film. Chopped glass is added at a wet out area prior to the second roll of film being placed on the top of the mix. The mix is heat cured in a series of ovens until complete cure is accomplished. The films are removed from both sides and the sheets are cut to 8'×4' pieces. Although ultra-violet screeners and anti-oxidants are contained in these panels, long term exposure results in yellowing and glass prominence. To overcome this tendency, a transfer gel coat is applied to the second sheet, at the front on the line and partially heat cured. The coating is transferred from the film to the sheet during cure, resulting in a gel coated panel with excellent weathering characteristics. The only problem with this approach is expense and the lack of versatility with a continuous system.

Class A Surface Mold Parts

In the production of a closed mold sheet molded and bulk molded parts, a critical part of the formulation involves the low profile additive that controls shrinkage and produces a Class A smooth surface. Usually these products are based on co-polymerization of styrene, methyl methacrylate, vinyl acetate or similar type monomers. The resulting polymer is added to a highly filled unsaturated polyester mix containing one or more heat activated catalysts. In some cases, magnesium oxide or an isocyanate component is added to induce chain extension maturation for increased physical properties. The mix is molded to form car bumpers, van tops and the like. Said additives have low profile characteristics, filler dispersion properties and compatibility with a variety of high molecular polymers. These additives can be used as a supplement or as the main low profile additive in S.M.C. or B.M.C. application at a much reduced cost.

SUMMARY OF THE INVENTION

Additives used in this patent are based on dicyclopentadiene, maleic acid or anhydride, and a compound containing one to four alcoholic hydroxyl groups. The function of the dicyclopentadiene is to supply air drying characteristics, low profile properties, high heat distortion, excellent weathering performance and increased filler dispersibility to the resulting polymer. The maleic acid, maleic anhydride (fumaric acid) provides the reactivity for monomer cross linking. This reaction is air inhibited. The alcoholic hydroxyl containing component controls the molecular weight and the solubility characteristic in the monomer. With the correct percentages of dicyclopentadiene, maleic acid, and the chosen hydroxy component, high molecular weight additives can be produced that will have styrene suppressing characteristics, gel coat properties, and low profile properties. Adjustments in raw material percentages and production techniques can control the necessary properties for said applications.

DETAILED DESCRIPTION OF THE INVENTION

In order to synthesize a polymer that will act as a styrene suppression agent, it is first necessary to describe exactly what the agent ideally must do. For static control of styrene emission, the additive must come to the surface and form a film much like a wax additive. The film will keep styrene in and air out. The absence of air will result in the complete cure of the unsaturated polyester. However, paraffin or candle wax additives have the affect of reducing surface adhesion and the forming of a hazy surface. Ideally, a styrene suppressant should come to the surface upon reaction initiation and form a film. Said film should be clear, mar resistant, weather and chemically resistant with little or no loss of adhesion when recoated or further laminated.

The invention relates to a series of air drying cycloaliphatic polymer resins that have styrene suppression characteristics.

The first step in producing said resin is to react maleic acid with dicyclopentadiene to form a 1/1 adduct as described in U.S. Pat. No. 5,252,682 (1993). This reaction is acid catalyzed and results in addition of maleic acid across the active double bond of dicyclopentadiene

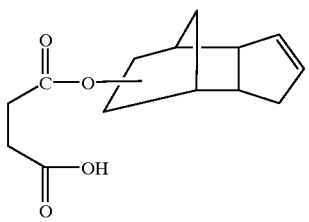

This 1/1 adduct is reacted with various alcohol, hydroxyl components to form 1/1 adduct when a singly hydroxyl component is employed, a 2/1 adduct when disfunctional components are used or a 3/1 adduct when trifunctional components are used.

The 1/1 adduct can be reacted with additional maleic acid or maleic anhydride and glycol to form end capped unsaturated polyesters.

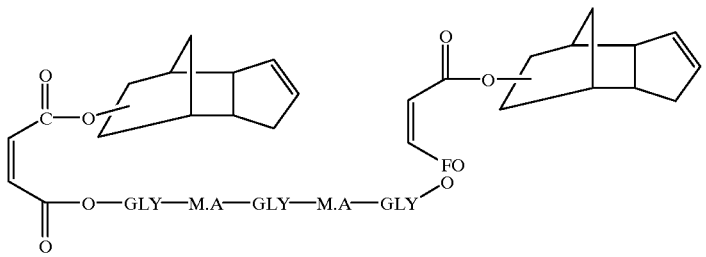

Molecule weight increase is controlled, not only by polyesterification, but also by "ene" reaction with the maleic or fumaric and nadic double bond in dicyclopentadiene. Molecular weights can vary from 1,000 to 4,000. Most desired molecular weight is 3,500–4,000. If too much "ene" reaction occurs, gelation of the resin will result.

At stage II, acid number should be at 15–25 and the molecular weight 1,000–1,5000 as estimately by Gardner bubble viscosity (C-D) at 60% solid/40% styrene. The cook temperature at this stage is 200–210° C. This temperature is reduced to 175–185° C. Dicyclopentadiene is added at these temperatures with the kettle under pressure (10 psi liquid nitrogen). Enough dicyclopentadiene is added to convert 90–95% of the maleic or fumaric double bonds to nadic double bond.

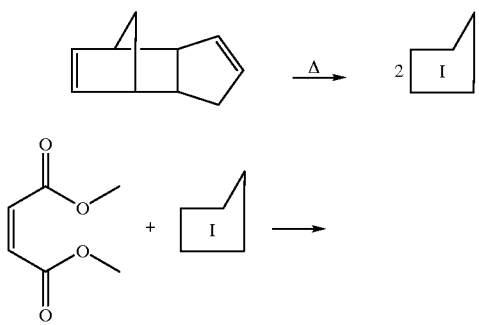

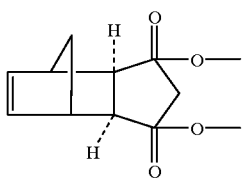

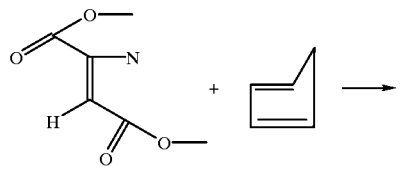

-continued

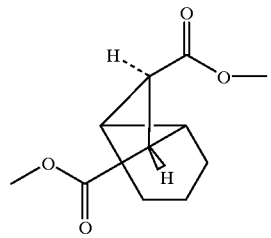

The chemical reaction is Diels/Alder and involves cyclopentadiene which form when dicyclopentadiene cleaves with heat to 2 monomer moieties. The polyester is then built up to the desired molecular weight and removed as an oligomer. The cooled oligomer can be suspended in a pigment grinding polyester for easier handling. When added to an unsaturated polyester resin 1–2% levels, reduction in styrene emissions allow the system to pass the California static emission test for styrenated systems (1% or less loss in weight after cure is 100 gms of catalyzed resin on a 1 gallon paint can lid).

The choice of glycol for the above application is critical. Dicyclopentadiene based polyester are normally quite soluble will not faze out of the reacting polyester. However, if a highly insoluble glycol is used e.g., 1,6 hexanediol, dimethanol cyclohexane, 1,8 octane diol, the resulting will faze out upon initial polyester reaction. The polymer must have sufficient solubility in the resin mix to be dissolvable and clear.

A similar type polymer is used for internal gel coating application in architectural sheet manufacture. The resin of choice is dimethanol cyclohexane due to its superior hardness, chemical and weathering resistance.

For molding application, neopentyl glycol is the resin of choice since the resin does not need to be partially soluble in styrene and is less expensive.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method of forming a weather resistant gel coat at a surface of an unsaturated polyester resin, comprising:
    forming an adduct in the presence of an unsaturated polyester, said adduct produced by
    reacting dicyclopentadiene and maleic acid or maleic anhydride to form a 1:1 molar ratio adduct,
    contacting the adduct with an organic compound containing one to four alcoholic hydroxyl groups, and
    allowing said adduct to form a gel coat at the surface of said unsaturated polyester.

2. An additive adapted to form a weather resistant gel coat at a surface of an unsaturated polyester resin, comprising:
    dicyclopentadiene, reacted with maleic acid or maleic anhydride, and
    an organic compound containing 1 to 4 alcoholic hydroxyl groups.

3. A composition adapted to form a weather resistant gel coat at a surface of an unsaturated polyester resin, comprising:
    dicyclopentadiene;
    maleic acid or maleic anhydride;
    an organic compound containing 1 to 4 alcoholic hydroxyl groups; and
    a copolymer of at least one monomer selected from the group consisting of styrene, methyl methacrylate, and vinyl acetate.

4. The method according to claim 1, wherein dicyclopentadiene is reacted with maleic acid.

* * * * *